(12) United States Patent
Hacking

(10) Patent No.: US 12,071,200 B2
(45) Date of Patent: Aug. 27, 2024

(54) SECTIONED MULTIPLE-STEP PULLEY TRANSMISSION

(71) Applicant: Sean Colin Hacking, Somes Bar, CA (US)

(72) Inventor: Sean Colin Hacking, Somes Bar, CA (US)

( * ) Notice: Subject to any disclaimer, the term of this patent is extended or adjusted under 35 U.S.C. 154(b) by 0 days.

(21) Appl. No.: 18/550,021

(22) PCT Filed: Feb. 23, 2022

(86) PCT No.: PCT/US2022/070779
§ 371 (c)(1),
(2) Date: Sep. 11, 2023

(87) PCT Pub. No.: WO2022/198163
PCT Pub. Date: Sep. 22, 2022

(65) Prior Publication Data
US 2024/0149975 A1 May 9, 2024

Related U.S. Application Data

(60) Provisional application No. 63/160,809, filed on Mar. 13, 2021.

(51) Int. Cl.
*B62M 9/08* (2006.01)
*B62M 9/16* (2006.01)
*F16H 9/10* (2006.01)

(52) U.S. Cl.
CPC ............... *B62M 9/08* (2013.01); *B62M 9/16* (2013.01); *F16H 9/10* (2013.01)

(58) Field of Classification Search
CPC ... B62M 9/14; B62M 9/10; F16H 9/24; F16H 55/54; F16H 55/56; F16H 9/06
USPC .......................................................... 474/47
See application file for complete search history.

(56) References Cited

U.S. PATENT DOCUMENTS

| | | | | |
|---|---|---|---|---|
| 1,044,535 | A * | 11/1912 | Kent ....................... | F16H 55/54 474/47 |
| 1,662,037 | A * | 3/1928 | Wichtendahl ............. | F16H 9/24 474/53 |
| 4,592,738 | A * | 6/1986 | Nagano .................... | B62M 9/14 474/162 |
| 5,073,152 | A * | 12/1991 | Browning ................. | B62M 9/16 474/162 |
| 5,205,794 | A * | 4/1993 | Browning ................. | B62M 9/14 474/160 |
| 6,267,699 | B1 * | 7/2001 | Gruich ..................... | B62M 9/14 474/49 |

(Continued)

*Primary Examiner* — Henry Y Liu
(74) *Attorney, Agent, or Firm* — Andrew Young; Nolte Lackenbach Siegel

(57) ABSTRACT

A pulley for a transmission system, including a central rotatable hub having a circumference; and a plurality of adjoining identical pulley segments rotatably mounted about the central hub circumference, wherein the adjoining pulley segments form an approximately circular stepped pulley shape and each of the pulley segments includes two sections providing two curved shelf surfaces for engaging a flexible drive member, each shelf having a different radius, forming higher and lower steps, and further wherein each of the pulley segments are independently rotatable about a radial axis with respect to the central hub.

16 Claims, 15 Drawing Sheets

(56) References Cited

U.S. PATENT DOCUMENTS

| | | | |
|---|---|---|---|
| 8,753,236 B2* | 6/2014 | Wong | F16H 9/24 |
| | | | 474/47 |
| 9,816,598 B2* | 11/2017 | Wong | F16H 9/06 |
| 10,259,532 B2* | 4/2019 | Schuster | B62M 9/14 |
| 10,988,207 B1* | 4/2021 | Earle | B62M 25/08 |
| 10,989,281 B2* | 4/2021 | Allen | B62M 9/10 |
| 11,214,333 B2* | 1/2022 | Zubieta Andueza | B62M 9/14 |
| 11,279,441 B2* | 3/2022 | Zubieta Andueza | B62M 9/12 |
| 11,572,131 B2* | 2/2023 | Allen | B62M 9/14 |
| 11,572,135 B2* | 2/2023 | Earle | B62M 9/1342 |
| 11,661,145 B2* | 5/2023 | Schuster | F16H 55/54 |
| | | | 477/47 |
| 11,685,468 B2* | 6/2023 | Zubieta Andueza | B62M 9/12 |
| | | | 474/156 |
| 11,808,339 B2* | 11/2023 | Wong | F16H 55/12 |
| 2002/0084618 A1* | 7/2002 | Lerman | B62M 1/36 |
| | | | 280/281.1 |
| 2011/0045928 A1* | 2/2011 | Wong | F16H 9/04 |
| | | | 474/47 |
| 2013/0267362 A1* | 10/2013 | Gheciu | B62M 9/105 |
| | | | 474/164 |
| 2014/0248982 A1* | 9/2014 | Schuster | B62M 9/06 |
| | | | 474/69 |
| 2016/0114858 A1* | 4/2016 | Magee | B62M 9/08 |
| | | | 474/49 |
| 2016/0169363 A1* | 6/2016 | Wong | F16H 9/24 |
| | | | 474/69 |
| 2017/0283006 A1* | 10/2017 | Schuster | B62M 9/14 |
| 2018/0290713 A1* | 10/2018 | Tetsuka | B62M 9/14 |
| 2021/0139104 A1* | 5/2021 | Earle | B62M 9/1342 |
| 2021/0245836 A1* | 8/2021 | Earle | B62M 9/136 |
| 2023/0294793 A1* | 9/2023 | Allen | B62M 25/04 |
| | | | 474/80 |

* cited by examiner

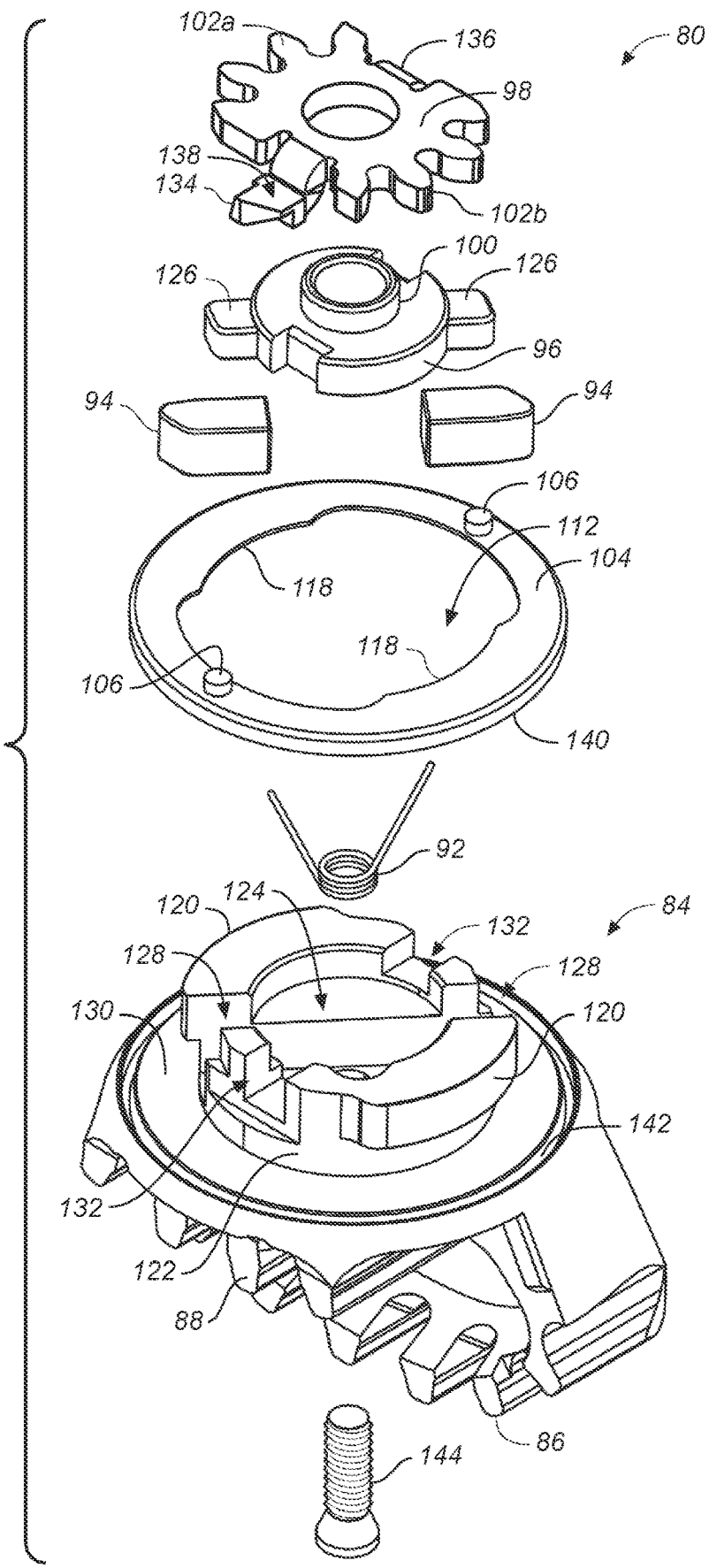

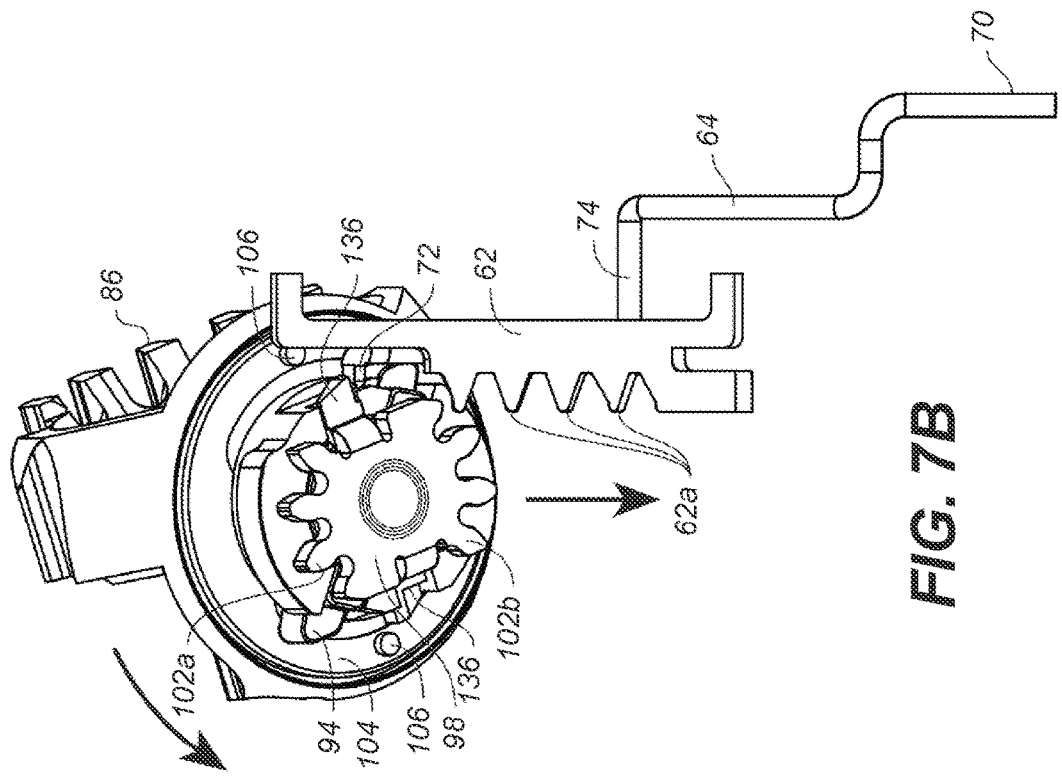
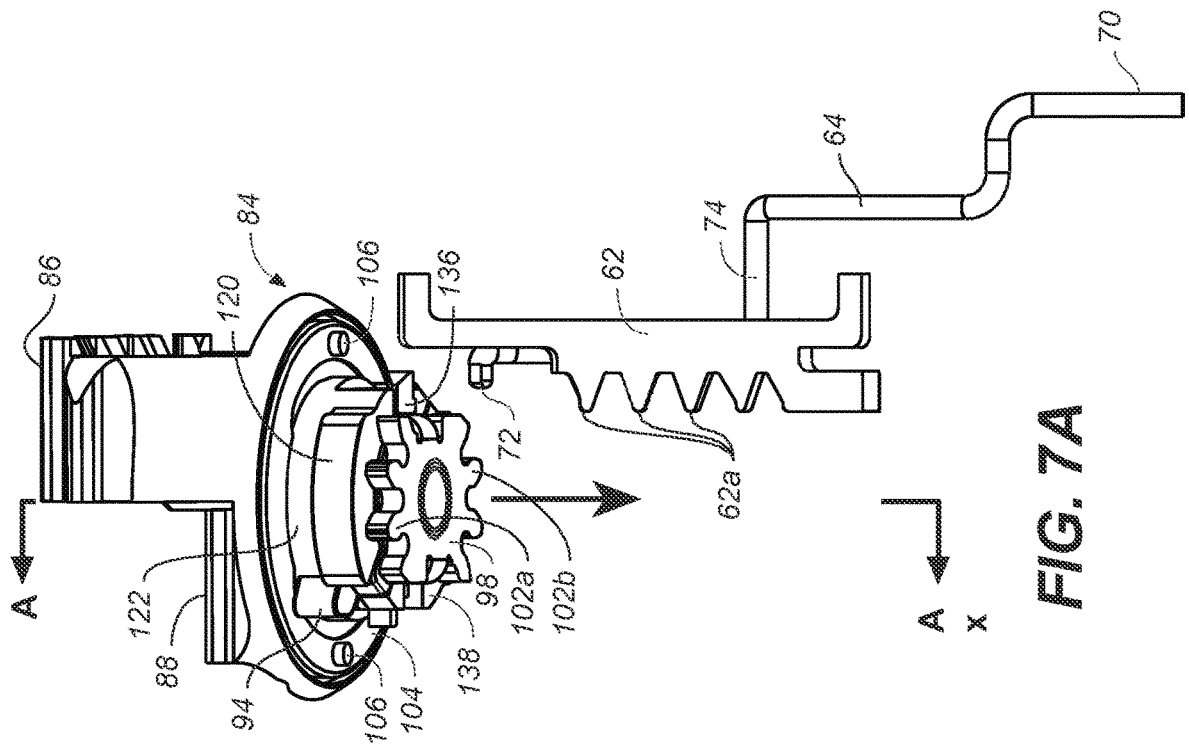
FIG. 7B
FIG. 7A

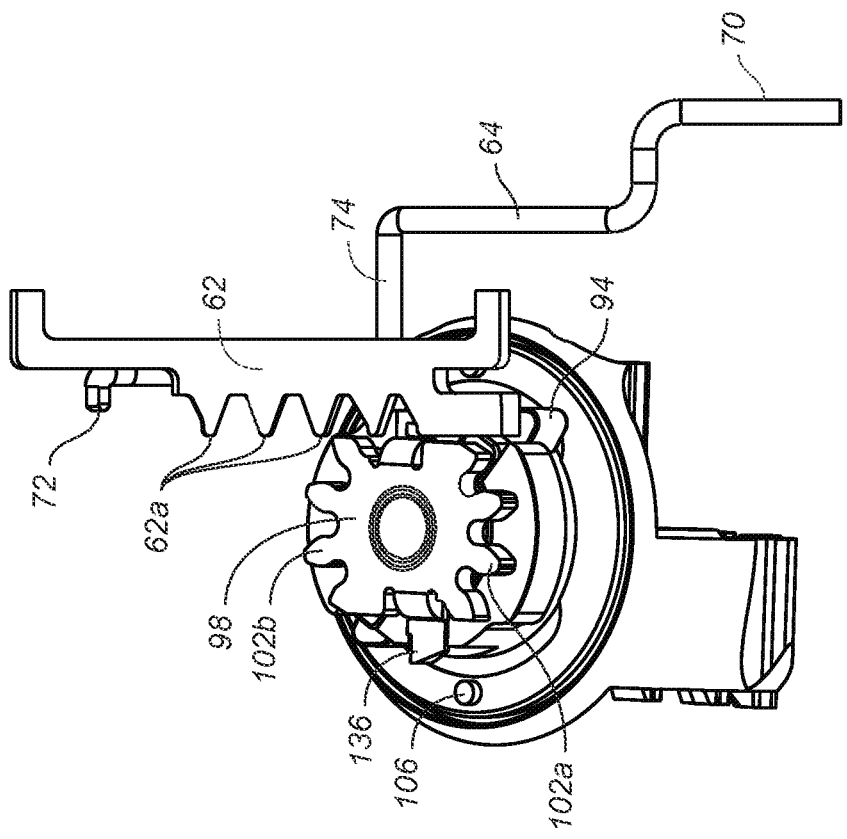
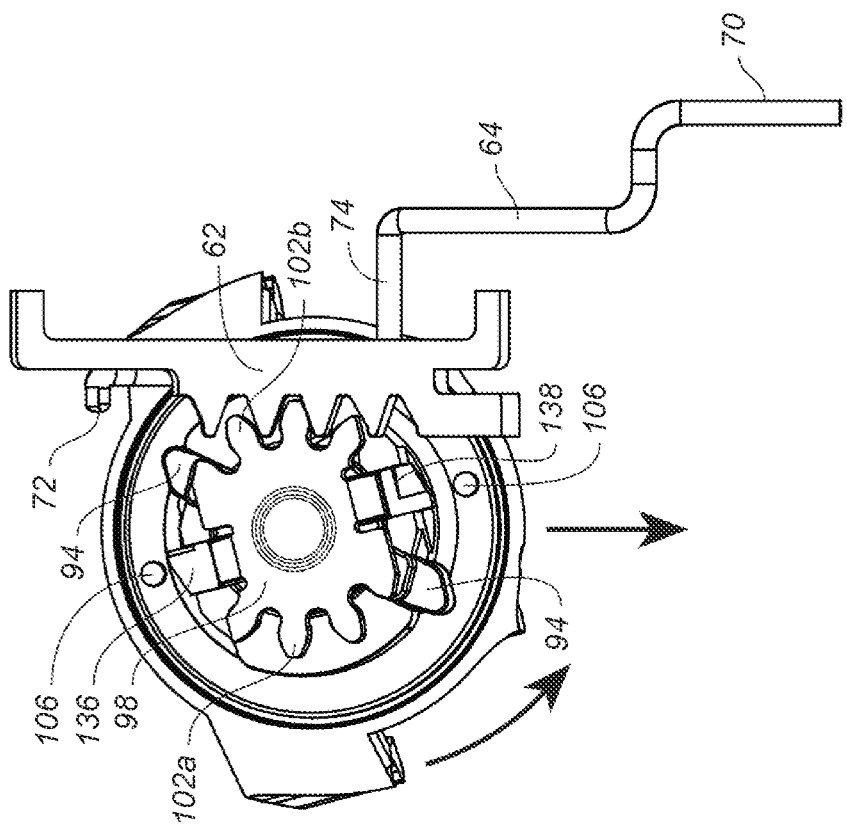
FIG. 7C
FIG. 7D

SECTIONED MULTIPLE-STEP PULLEY TRANSMISSION

BACKGROUND OF THE INVENTION

Technical Field

The present invention relates most generally to gear shifting mechanisms for vehicles, and more particularly to shifting mechanisms for multistage gears engaging a continuous belt or chain, and still more particularly to an internal transmission multiple step pulley and pulley shifting hub assembly for use with a flexible drive member to change the ratio between drive and driven gears in a bicycle or other lightweight motor vehicle.

Background Discussion

For decades, the bicycle has been eclipsed by the automobile as a principal mode of transportation, the latter especially well-suited for long commutes from suburbs to urban workplaces in urban areas designed for such an unfortunate combination. But automobile dominance may be yielding, as bicycles are again attracting attention as an important alternative transportation technology, particularly in urban settings. This is due to the health benefits of bicycling, the need to reduce fossil fuel consumption, the sheer pleasure of cycling as an activity, the decreasing importance of motor vehicles and mass transportation for remote workers, and the rapid evolution of pedal assist bicycles and smart bike-sharing systems.

Moreover, and entirely setting aside the use of bicycles for transportation, with the advent of mountain biking some four decades ago, and its evolution and spin off sports in myriad categories or specialties in bicycling competition and recreation (cross country, trial riding, dirt jumping, all-mountain/enduro, downhill, to name just a few), bicycles have become the focus of significant investment and innovation. Because of its importance to power and efficiency, a major area of technological innovation in bicycling has been in gear shifting mechanisms and transmissions.

Mechanical transmissions are an important part of machinery and vehicles generally, transmitting rotational motion from a driving mechanism to a driven mechanism while varying rotational speed. Disadvantageously, most transmissions for shifting gears must temporarily disconnect the motor from the load during a shift event, typically using some kind of clutch mechanism. This results in loss of power for at least a brief period of time; and simply to operate, the system calls for a companion mechanism in the form of a clutch of some kind, which engages and disengages the motor and load during shifting. Alternatively, in such systems as bicycle transmissions and gear changing apparatus, the "clutching" is effected by reducing the load on the drive pulley so as to enable the drive member to move to an alternate gear (i.e., pulley).

There are advantages, therefore, in providing and using a transmission that shifts without the need to disconnect the motor from the load and, correspondingly, eliminates the need for a clutch. Simplicity, efficiency, compactness, and improvements in overall performance are all promoted.

Contemporary bicycles almost invariably using some kind of flexible drive member to transfer power to a driven wheel. The flexible drive members, such as belt drives and chain drives, transmit power efficiently, inasmuch as they are lightweight and can operate without continuous lubrication. But the advantages diminish when the drive member is paired with a secondary gear shifting transmission or clutch system.

It would be desirable, therefore, to integrate a shifting mechanism directly into the drive chain pulleys (i.e., the sprockets or gears) to obviate the need for a secondary transmission system. However, flexible drive configurations with a gear shifting mechanism structurally and operationally built into the sprockets or pulleys are rare; there are few and limited viable theoretical designs. This is because the drive member must usually disconnect from the pulley to move the drive member to a pulley of another size, through the use of a derailleur, for instance. Alternatively, the drive member must flex on its lateral axis to "climb" onto a pulley of a different size, causing suboptimal loading and high amounts of wear. And in bicycle chain drives, this means the drive member is often poorly aligned with the sprockets.

One method of addressing the alignment issue is to split the driven pulley, such that it is formed from multiple sections. The sections are smaller than the area of the pulley not in contact with the drive member, and when the section is passing through the portion of rotation while not in contact with the drive member, it may be shifted—i.e., replaced with a pulley that changes the ratio (relative diameters) between the drive and driven pulleys. In such a configuration, no drive forces are experienced by the pulley section as it moves.

Pulleys made from independently movable sections have been described and are known in the art. These prior art systems include pulley sections that move either radially or axially with respect to the pulley shaft to come into alignment with a drive member. The pulley segments move either to increase or to decrease the effective diameter of the pulley during a shift, or new segments of different sizes are moved radially to be in line with the drive member to effectively form a pully of a different diameter engaging the belt.

Notable examples may be found in U.S. Pat. Nos. 9,816,598, 9,625,014, and 8,753,236 to Wong, each of which describe a synchronized segmentally interchanging pulley transmission system. At least one of the pulley sets in the systems includes a plurality of toothed, concentric, and coaxial pulley segments in a pulley segment set axially moveable along channels or rails into and out of the path of an endless drive member. One of the pulley segments of the pulley segment set acts as a key pulley segment that facilitates the coordinated and synchronized change of drive member engagement of the pulleys in the pulley set without disrupting their rotation or the delivery of power. Notably, changing gears involves changing pulley segments through axial movement of pulley segment, not rotation of the segments.

Another method for moving pulley sections in line with a drive member is to rotate the section about an axis substantially tangential to the circle scribed by the pulley section as it rotates about the pulley shaft, thereby placing sections of different diameter in line with the drive member. This arrangement prevents linear motion between parts and has associated disadvantages and has packaging, mechanism sealing, and actuation issues, especially when used with wide drive members, such as flexible belt drives.

Not uncommonly, bicycles having a generally low number of gears in a multispeed gearing system use an internal-gear hub. These gear systems are based on the use of planetary gears which are in mesh with, and rotate about, a sun gear affixed to a wheel axle. The planetary gears, usually, ranging from three up to seven or more in number, are identically sized and are also in mesh with an outer gear or planet cage, which has interior teeth in mesh with the exterior teeth of the planetary gears. The gear employed at any one time is determined by the combination of gears engaging the planet and sun gears, as well as the planet cage. These systems enjoy the advantage of durability and easy maintenance due to their enclosed configurations, but they are heavy, technically complicated, and not amenable to unprofessional repair. Well-known and commercially successful systems include the Shimano ALFINE®, Shimano NEXUS®, and the numerous Sturmey-Archer internal-gear rear hubs. These truly wonderful systems don't avoid the disadvantage of decreased efficiency in having to mesh gear teeth; indeed, the problem is actually amplified in systems having multiple stages, such as the ALFINE system referenced above. [ALFINE and NEXUS are registered trademarks of Shimano, Inc., Osaka Japan.]

The foregoing patents and commercially available products reflect the current state of the art of which the present inventor is aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

DISCLOSURE OF INVENTION

In embodiments the present invention offers a solution to several of the above-described problems by providing a sectioned pulley transmission with pulley sections that quickly rotate, seriatum, on a hub in a shift window region (i.e., a portion of the pulley rotation in which the pulley segment does not engage the flexible drive member) such that surfaces of different diameters may come into alignment and engage a flexible drive member, thereby changing the drive speed while maintaining synchronous motion.

Each pulley segment includes two or more pulley steps, each pulley step being a rounded shelf with a surface that engages a flexible drive member, such as a belt or chain. In an embodiment, the pulley segment is divided into sections, such that the flexible drive member may transition between shelves which have a different distance from axis of wheel rotation (i.e., the hub axis of rotation), thereby changing the mechanical advantage applied between the drive member and a shaft, or between two drive members.

In embodiments, the sectioned pulley includes at least two, and possibly several, drive-member-engaging surfaces formed into each movable section. The pulley section positions are shifted with a stationary partial ring gear disposed in a central hub. The partial ring gear engages a pinion gear affixed to a rotatable pulley section. A shift (i.e., a rotation of the pulley sections comprising the circumference of the pulley) is actuated in a "shift window" region where the drive member is not in contact with the pulley, a portion of every rotation of the sectioned pulley on the central hub.

A drive member retainer ensures constant engagement of the drive member with the pulley on all pulley sections not in the shift window portion, even under high loads. (Those portions may be characterized as the drive portions merely to distinguish them from the shift window portion.) For instance, in embodiments, a variable force tensioner takes up drive member slack introduced when the drive member is shifted from a shelf of large diameter to one of a smaller diameter. In embodiments, the drive member constraint has a surface, such as that provided by an idler wheel, that constantly or intermittently slides or rolls against the flexible drive member as it engages with the multistep pulley so as to maintain constant drive engagement. The constraint is movable during operation so that the distance between the constraint and the multiple step pulley can be varied depending on drive load, pulley size, or operating conditions.

Still more, the inventive system may include a novel modular flexible drive member to transmit power to or from the sectioned pulley. A modular flexible drive member made from individual segments or links is used to enable incorporation of the system into many different machines with a high load carrying capacity.

In embodiments, the system employs a toothed belt formed from one or more connectable belt segments containing a plurality of drive teeth. The belt segments are configured with inter-engaging tongues at the abutting ends of the belt segments. Teeth in the abutting ends have transverse apertures allowing connecting pins to extend transversely across the belt segments and to insert through the apertures to lock the belt segment ends together. Belt segments may have teeth or protrusions on more than one side of said flexible region.

It will be seen that in its most essential aspect, the present invention comprises a multiple step pulley for variable power transmission configured with multiple independently movable pulley sections or segments. The pulley sections are each configured with at least two shelves configured to engage the flexible drive member. In embodiments, the shelves may be in a side-by-side relationship and rotate about a center axis (pulley section axis) which is oriented substantially radial from, and normal to, a wheel axle. In a two-speed embodiment the paired shelves straddle an axis such that a 180-degree rotation places one of the paired shelves into engagement with the drive member and one of the shelves into a non-engaged relationship with the flexible drive member.

In embodiments, the multiple-step pulley is implemented as a bicycle rear wheel transmission for transmitting motive force from the drive wheel. In other embodiments, it may be incorporated in the front, drive pulley of a bicycle, in pedal assist bicycles, in electric bicycles and scooters, and in numerous other wheeled vehicles. Moreover, the inventive transmission may be embodied in any system comprising drive and driven pulleys in which varying gear ratios between the drive and driven pulleys confers one or more mechanical advantage on the system.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings, wherein:

FIG. 4 is an exploded perspective view of an embodiment of a pulley segment as used in the present invention;

FIG. 7A is a partial perspective view showing the initiation of a gear shift, which includes a pulley segment moving into engagement with a selector tooth moved into the path of a shift hook incorporated into a pinion gear affixed to the pulley segment;

FIG. 7B is the same view showing the selector tooth engaging the shift hook and rotation of the pulley segment in a beginning phase of a shift;

FIG. 7C is the same view showing the pulley segment rotation continued by engagement of the pinion gear with a stationary partial ring gear;

FIG. 7D is the same view showing completion of the shift and disengagement of the pinion gear with the partial ring gear.

Figure 1A:
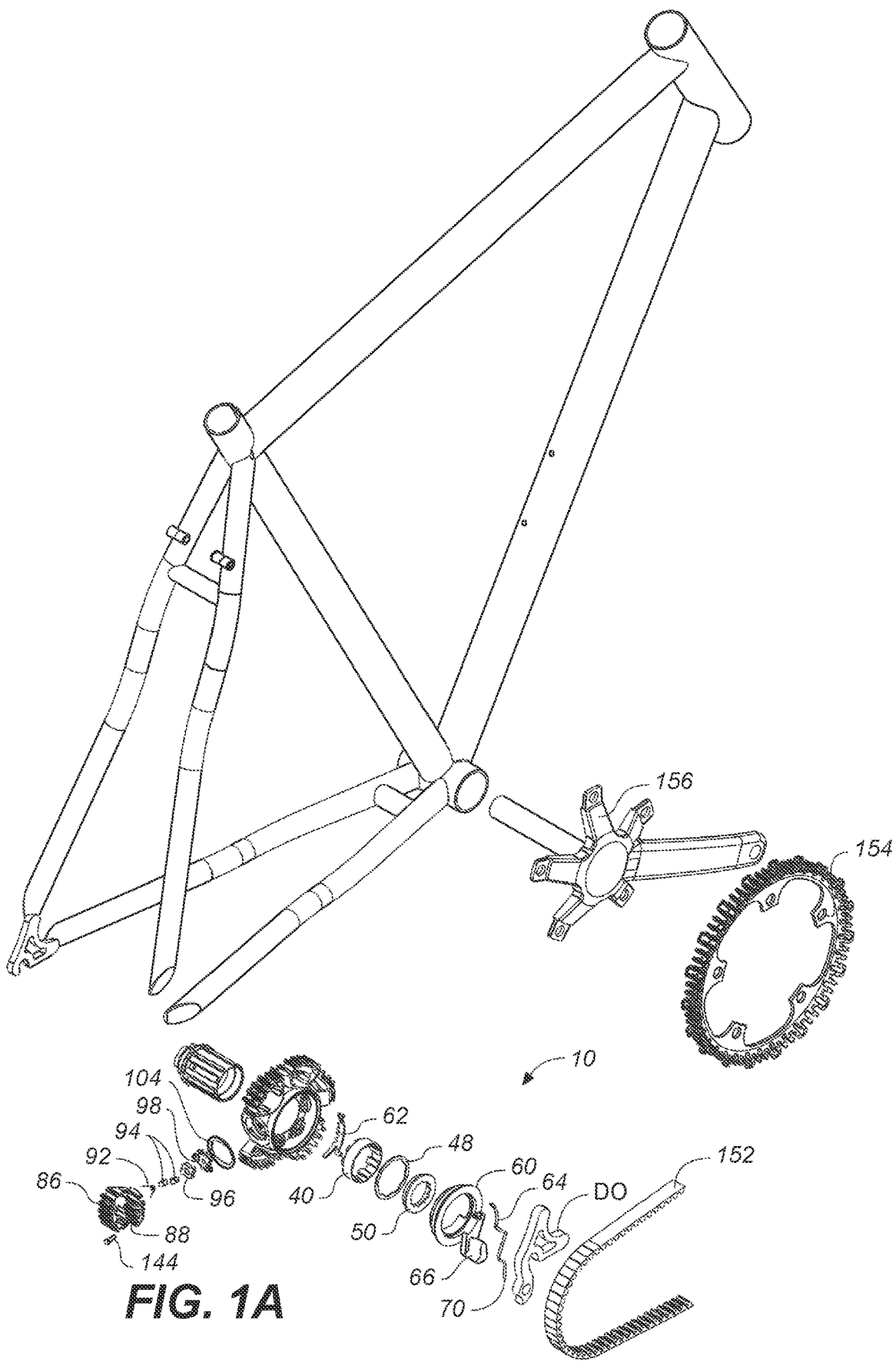
FIG. 1A is an exploded upper right rear perspective view showing the drive and transmission components of the inventive segmented multistep pulley transmission, the view partial in excluding a variable force tensioner.

Note: The foregoing view orientations are expressed according to conventional vehicle terminology, and in thus from the perspective of a mounted rider.

DETAILED DESCRIPTION OF THE INVENTION

Referring to FIGS. 1 through 13, wherein like reference numerals refer to like components in the various views, there is illustrated therein a new and improved sectioned multistep pulley transmission for vehicles, generally denominated 10 herein. Referring first to FIG. 1A through FIG. 4, there is shown the principal components when implemented as an internal gear hub on a belt-driven bicycle. Here it can be seen that the assembly includes a central hub 12 having an outer shell or hub shell 12a, an inner hub core 12b, a left cylindrical axial opening 14 and a right cylindrical axial opening 16. Axially disposed in the central hub's left side axial opening 16 is a cassette body (or freehub) 18, also having a cylindrical left side axial opening 20 and a cylindrical right side axial opening 22. The axial openings in the cassette body are configured to accept and pass a wheel axle (not shown), with or without an axle spindle and quick release elements. The wheel axle acts as the axis about which the central hub rotates—i.e., it is the central hub axis.

The cassette body includes spaced apart axially oriented surface splines or ribs 24. These are shaped to enable slidable insertion of the cassette body into the left side axial opening 16 in the central hub, which complementarily configured with alternating and spaced apart landings 26 and channels 28 to create mechanical coupling of the cassette body and central hub. Thus, when the cassette body is so inserted, rotation of the central hub induces corresponding rotation of the cassette body.

The left end 30 of the cassette body is configured to connect to a freehub shell having flanges for wheel spokes, as well known in the art. Rotational motion of the central hub is thus coupled to rotational motion of the freehub shell and ultimately the bicycle wheel. The left end of the cassette body also includes a rim 32 which sealingly engages a flat land 34 on the left side of the cassette body, sealing the axial opening 20 on that side.

The central hub 12 has a cylindrical interior sidewall 36 into which a freehub body body spacer 38 is inserted. The smooth exterior side 40 inserts with spacing proximate the interior sidewall 36 of the central hub, while the interior side includes splines 42 configured to accept insertion of the cassette body 18. The right end of the cassette and the freehub body spacer are capped and sealed at their right ends 44, 46, respectively, by a body spacer faceplate 48 and a cassette body lock ring 50, the latter threadably inserted into the right axial opening of the cassette body. The assembled right end is journaled in a bushing 52 integrally formed on the interior side 54 of a shift ring 56, which forms a key portion of the shifting mechanism employed in the present invention (along with a stationary ring gear and shift wire, described more fully below).

The shift ring, and thus the integral bushing, may be made of low friction plastic. In embodiments in which the bushing is not integral, the shift ring may be fabricated from aluminum or titanium and the bushing may be surfaced with a polymer film to reduce friction and wear. Loads are minimal at this location, so bearings are not required to ensure free rotational movement of the freehub spacer within the bushing. A resilient O-ring 58 is disposed at the junction of a sealing flange 60 and the bushing. This combination assembled and inserted into the central hub seals the right side of the central hub and thus completes an enclosure of the axial openings of the central hub.

The bushing is sized with a clearance from the interior sidewall of the central hub sufficient to position and secure a partial stationary gear ring 62 and to accommodate small movements of the shift wire 64 at the side of the freehub body spacer when a shift is initiated by a user.

Note that the interior portion of the central hub and cassette body rotate around the stationary shift ring 56, gear ring 62, and shift wire 64. The shift wire is configured to rest in a shift wire cradle 66 disposed on the outer side of the shift ring and to be slidingly disposed through a hole 68 in the shift ring flange 56. The outer end 70 of the shift wire is operatively connected to a shifting element, such as a cable or chain or other movable element, which may be actuated by a user either manually or electronically to initiate a shift event. Movement of the shift wire is a rotation about its medial axis, which translates into radial motion of a selector tooth 72, which is integrally formed at the upper interior end of the shift wire, and when the outer end 70 of the shift wire is moved, the selector tooth moves radially outward either toward or away from the interior sidewall 36 of the central hub 12 along the interior wall 54 of the sealing flange 60 of shift ring 56. Thus, when the lower end 70 of the shift wire 64 is moved forwardly and outwardly relative to the shift wire cradle 66 (for instance, when pulled by a shift cable), the shift wire 64 rotates about a medial lateral portion 74, and the selector tooth 72 moves inwardly and into a first engaged position. And when the lower end 70 is moved back into a seated position in the shift wire cradle, the selector tooth moves into a second engaged position. [The operational effect of these movements is discussed more fully below.]

The wheel axle disposed through the hub assembly is secured in a conventional drop out DO at its right end, the drop out shown here only for orientation, as it does not comprise an element in the inventive apparatus.

The transmission next includes a plurality of pulley segment assemblies 80, which when assembled are each adapted for rotatable mounting on and through one of a corresponding plurality of mounting platforms 82 on the central hub 12. The pulley segment assemblies include a pulley section 84, which in embodiments have at least first and second shelves, e.g., a high gear shelf 86, and a low gear shelf 88, and a base portion 90. The base portion is configured to capture a pawl spring 92 having ends that urge pawls 94 outwardly and into engagement with the interior wall and notches in the mounting platform opening 110, discussed more fully below. The pawls are disposed between a ratchet 96 and a pinion gear 98. (As described more fully below, the pawls 94 engage detent notches 146 in the central hub 12a.) An integral bushing 100 is rotatably inserted into a center hole in the pinion gear (the center hole not shown) lowers the rotating friction of the pulley section and retains the ratchet pawls 94, pawl spring 92, and pinion gear 98. The assembly is stacked and then rotatably secured onto a bushing (preferably polymeric) 104, which has indexing pins or bosses 106 which insert into apertures 108 in the planar land 34 of the mounting platform 82. The indexing pins prevent the bushing from rotating with the pulley section. The bushing itself reduces friction during pulley segment rotation.

The mounting platform next includes an opening 110 with a shape matching that of the opening 112 in the bushing 104. The openings in the mounting platform and bushing pass through the hub shell 12a to show a threaded mounting boss 114 disposed on the hub core 12b. The openings in the mounting platform and bushing also each include opposing arcuate portions 116 and 118, respectively. These accommodate opposing arcuate male portions 120 of a pulley section gear mount 122, which includes a cylindrical center opening 124 and is configured to receive and capture torsion spring 92, pawls 94, and ratchet 96. Ratchet 96 includes wings 126 disposed in ratchet and pawl channels 128 in the pulley section gear mount 122, which stabilizes the ratchet and prevents it from rotating in the cylindrical opening 124 in the gear mount. Pawls 94 are disposed between the wings 126 and the pulley section base 130, which is circularly- or disc-shaped. Pawls that detent the pulley sections also prevent rotation of the pulley segments when under drive loads. They accomplish this by forming a one-way ratchet and detent.

The pulley section gear mount 124 also includes a second pair of channels 132, which function as windows through which first and second shift hooks 134, 136 are disposed. The first and second shift hooks, as described more fully below, will engage the selector tooth in one of its first and second engaged positions. This is because they are disposed in different planes relative to the pinion gear, with the top 138 of the first shift hook 134 nearly coplanar with the bottom (not shown) of the second shift hook 136. Thus, when the selector tooth 72 of the shift wire 64 is in the first engaged position, it will engage the first shift hook, but the second shift hook will pass untouched.

Figure 1B:
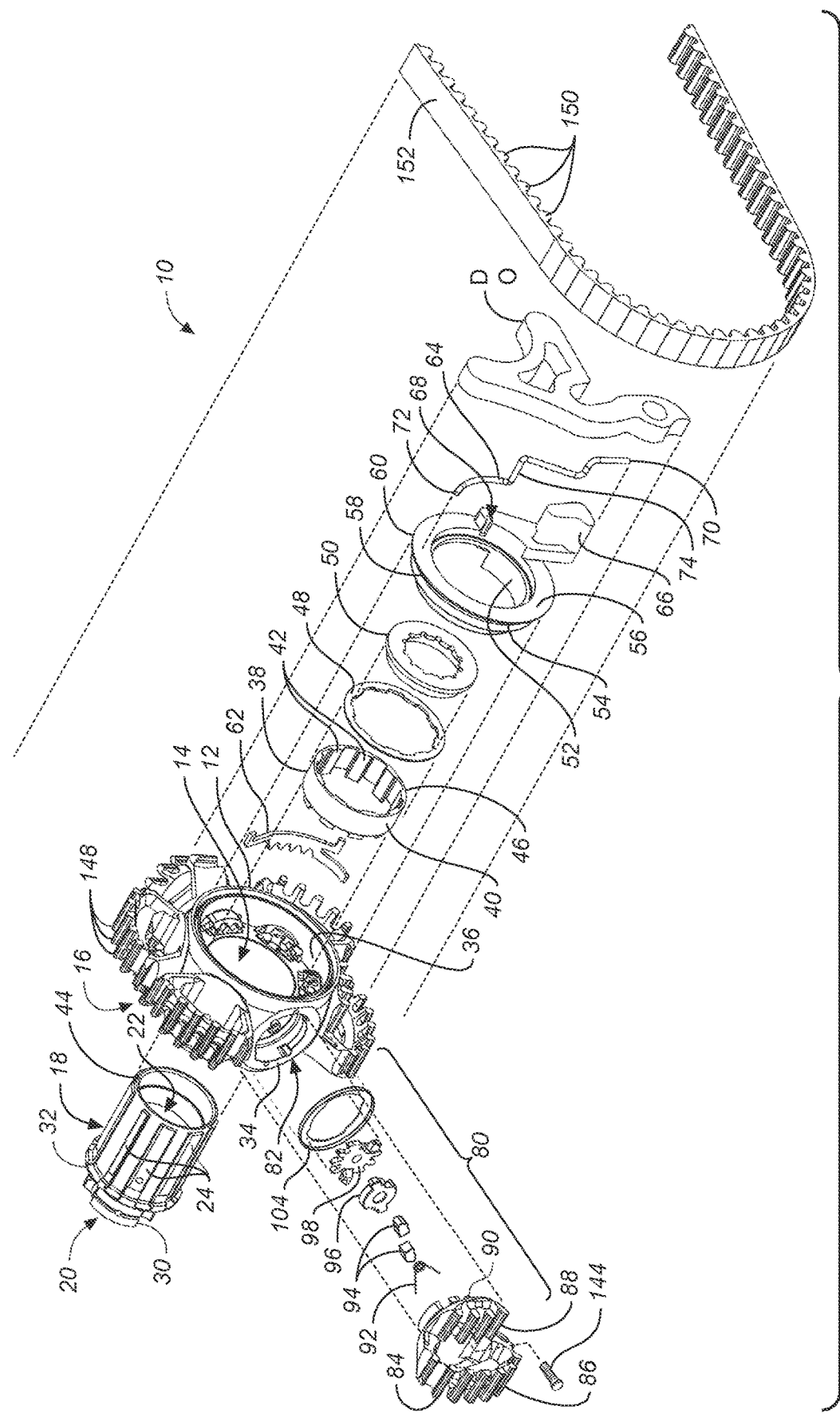
FIG. 1B is the same view showing more details of the transmission system only.
Figure 2:
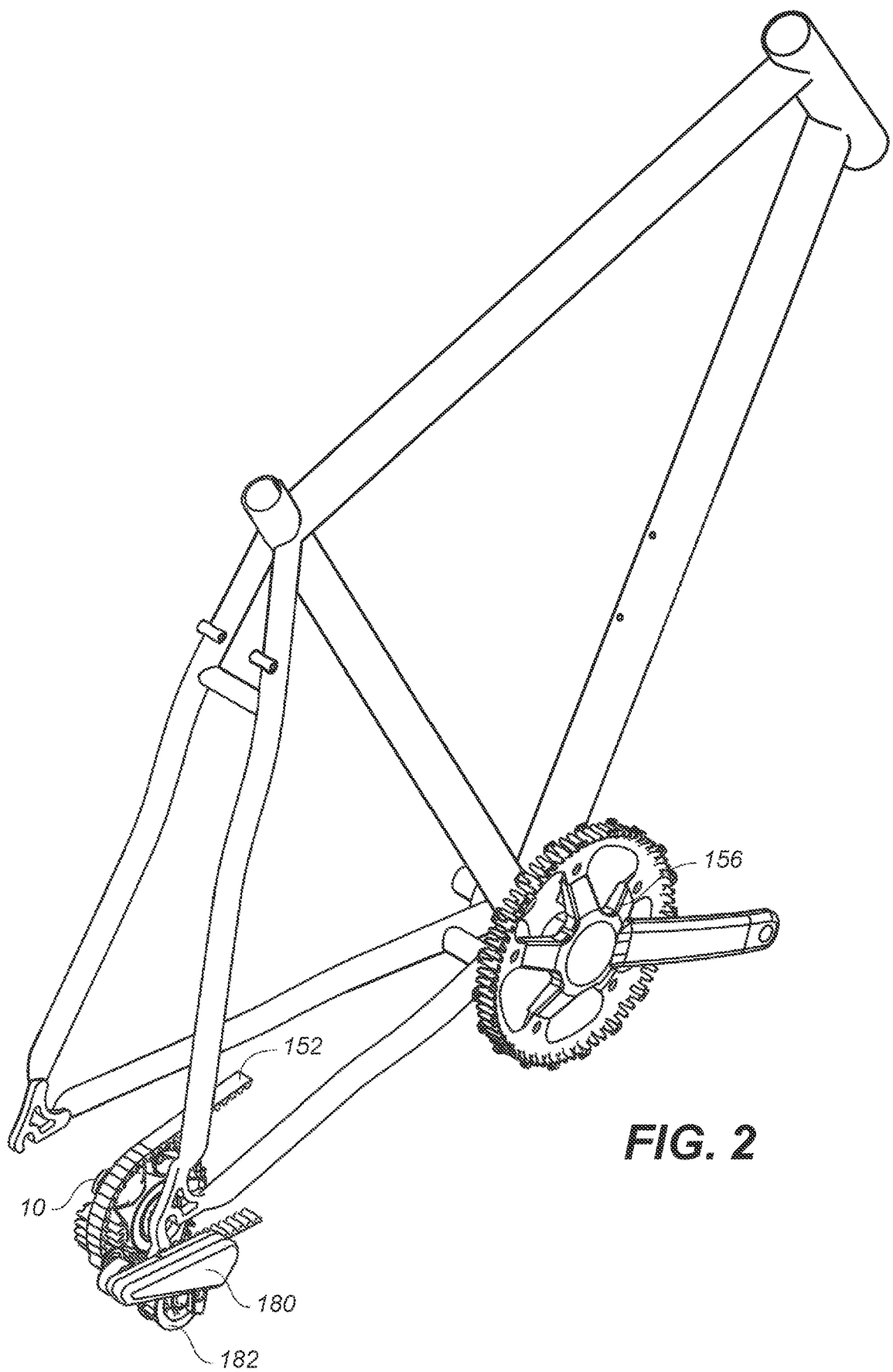
FIG. 2 is an upper right rear perspective view showing the transmission and front drive components assembled, and including the variable force tensioner.

Note that pinion gear 98 includes symmetrically opposing sets of gear teeth 102a, 102b, which, along with the first and second shift hooks, extend into the interior space between along the interior hub sidewall. This is best seen in FIG. 1B.

When assembled, a circumferential rim 140 on the bushing 104 slidingly inserts into a circumferential slot 142 in the pulley section base, which secures the bushing and prevents dirt intrusion, and an insert screw 144 passes through the center holes of the various elements to place them into a stacked relationship and then to insert threadably into the threaded mounting boss 114, which secures the pulley segment assembly in and on the central hub.

When the pulley section rotates during a shift event, the spring-biased pawls function as detent pins and are urged against the interior sidewalls 116 of the mounting platform opening 110. When they reach detent notches 146, they terminate pulley section rotation and place the pulley into an aligned relationship with the drive member until the pulley section is urged out of its fixed position by engagement again with the selector tooth, as described more fully below.

Figure 3:
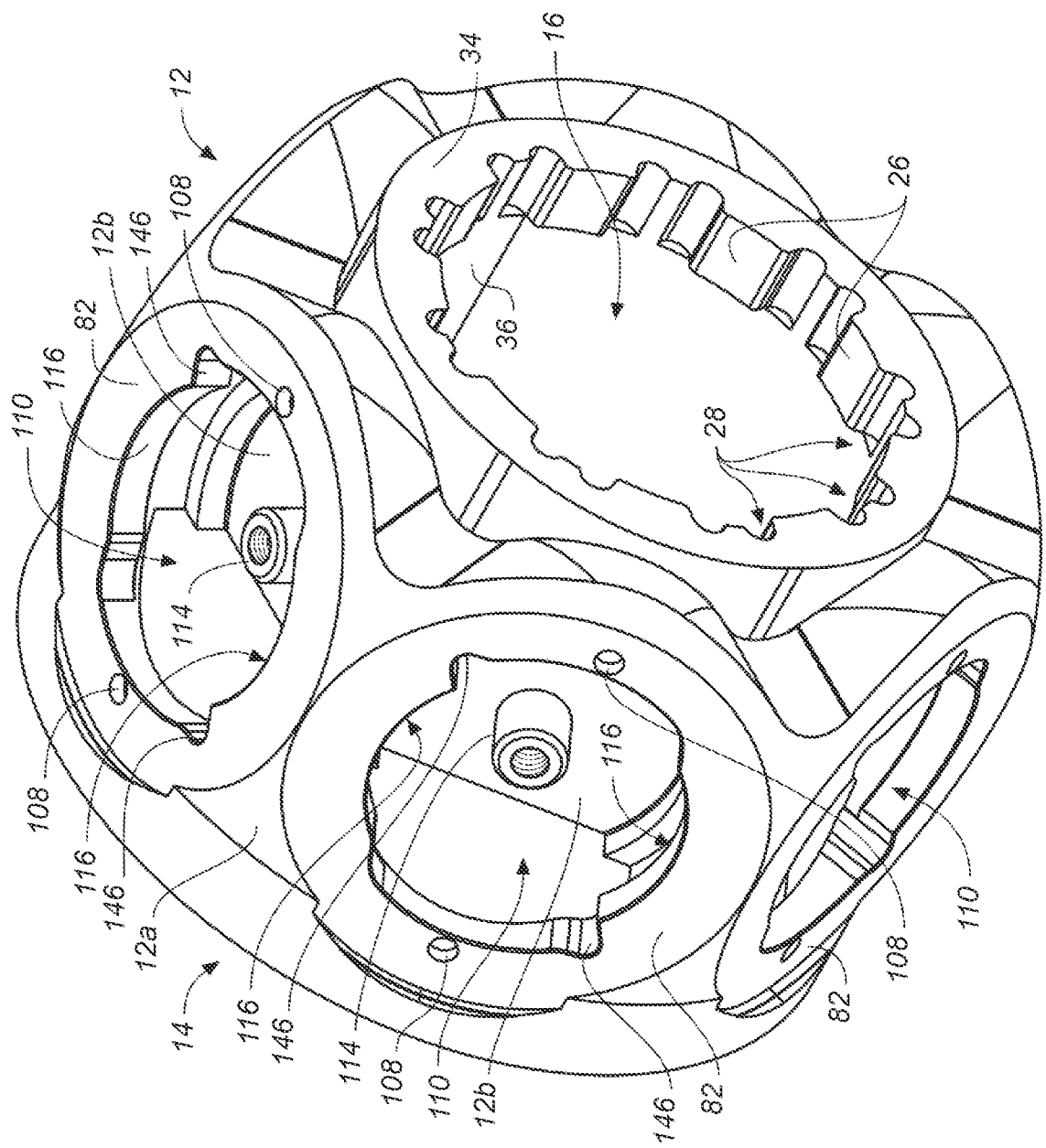
FIG. 3 is an upper left perspective view of the central hub of the sectioned multiple-step pulley transmission.

Referring to FIGS. 3-4, the interior sidewalls 116 of the mounting platform cooperate with the opposing arcuate male portions 120 of the pulley section gear mount 122 to form a keyway, T-slot relationship, wherein the pulley segment can be inserted into the hub when only very specifically aligned according to the keyway configuration, and thereby also creates a twist lock relationship.

In embodiments, the pulley section shelves each include gear teeth 148 adapted for mesh coupling with the teeth 150 of a flexible drive member 152, such as a drive belt. Thus, and referring back now to FIG. 1A to FIG. 2, the transmission system when adapted for use on a bicycle, is powered by force supplied by a rider supplying force through pedals to a belt drive chain ring 154 bolted to a crankset spider 156.

Each pulley section has an inwardly tapering shape from the shelf surfaces to the base, which enables rotation of each section in relation to immediately adjoining sections. Further, the pulley section shelves round at their ends, with gear teeth dropping below the shelf level so as to create a gap 158, a discontinuity, in the rows of teeth in adjoining pulley sections (see, for instance, FIG. 5 and FIG. 13). In consequence, at least one tooth of the flexible drive member in the gap space is not disposed in a space between shelf gear teeth. In an embodiment with six pulley sections, the number of drive member teeth not disposed in pulley section teeth is only three in number, and testing has demonstrated this to have no appreciable effect at real-world operational loads.

Figure 5B:
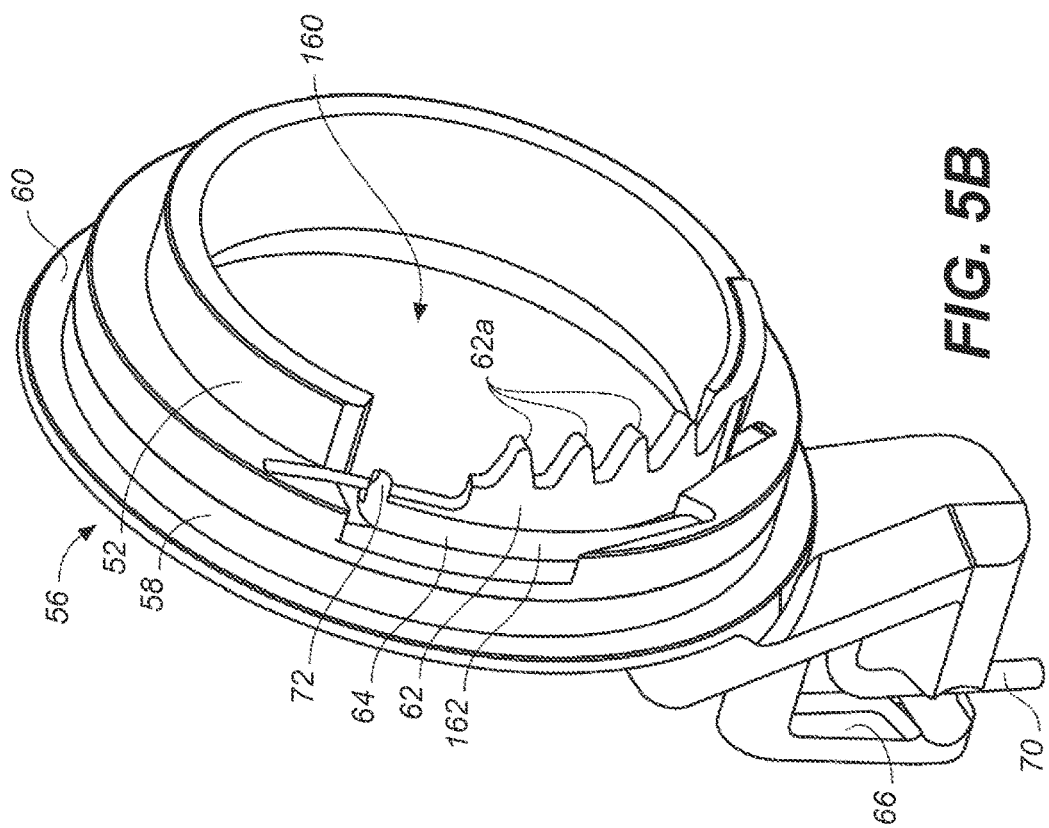
FIG. 5B is an upper perspective view showing the inner side of the shift ring, shift wire, and partial stationary ring gear.
Figure 5A:
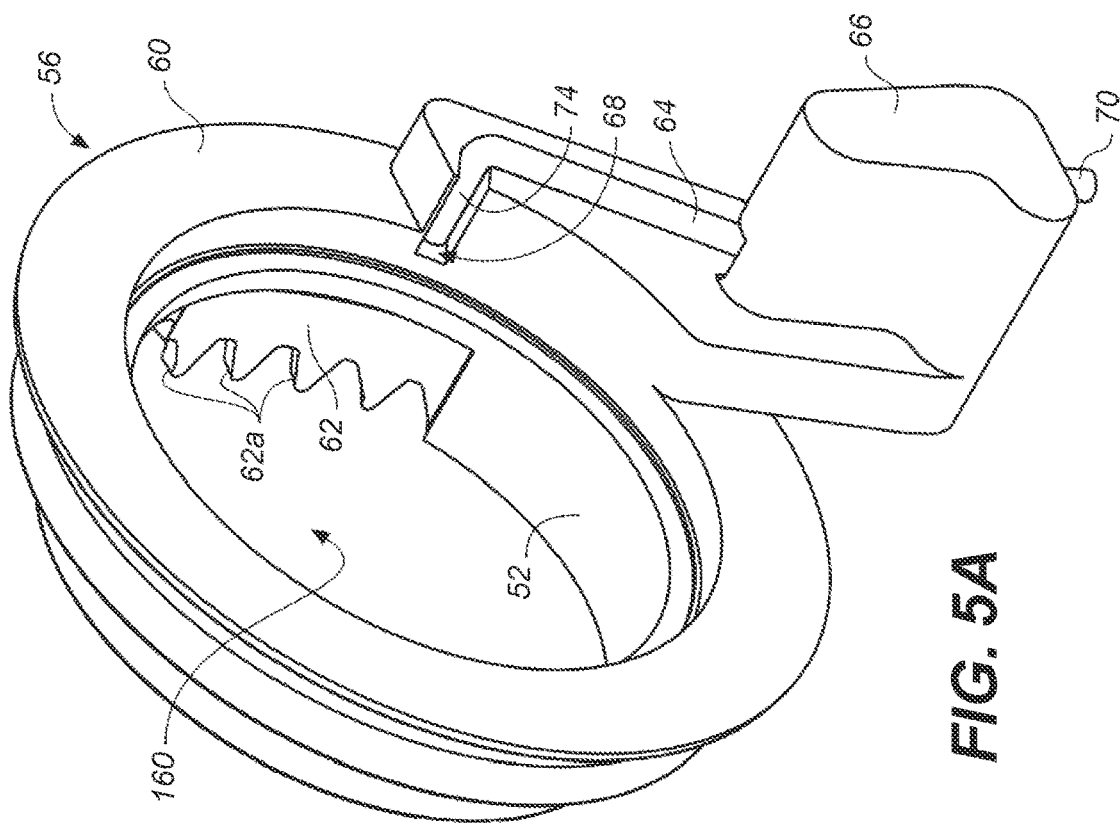
FIG. 5A is an upper perspective view of the outer side of the shift ring showing the structural and operational elements involved in shift events, namely the shift ring, shift wire, and stationary partial ring gear.
Figure 6:
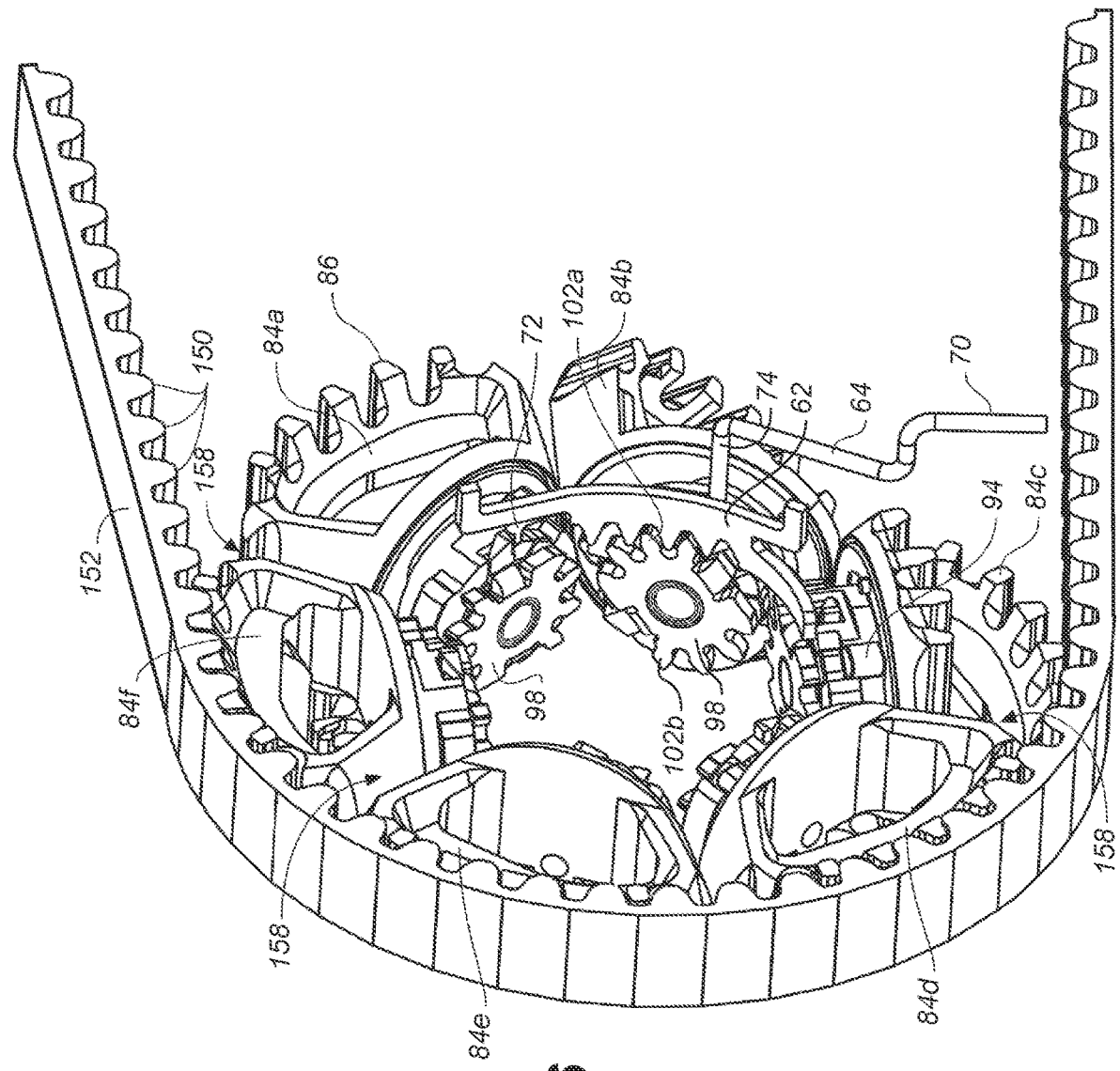
FIG. 6 is a right rear perspective view of the operative and active shifting components of the transmission, here shown with the central hub removed for clarity.
Figure 8:
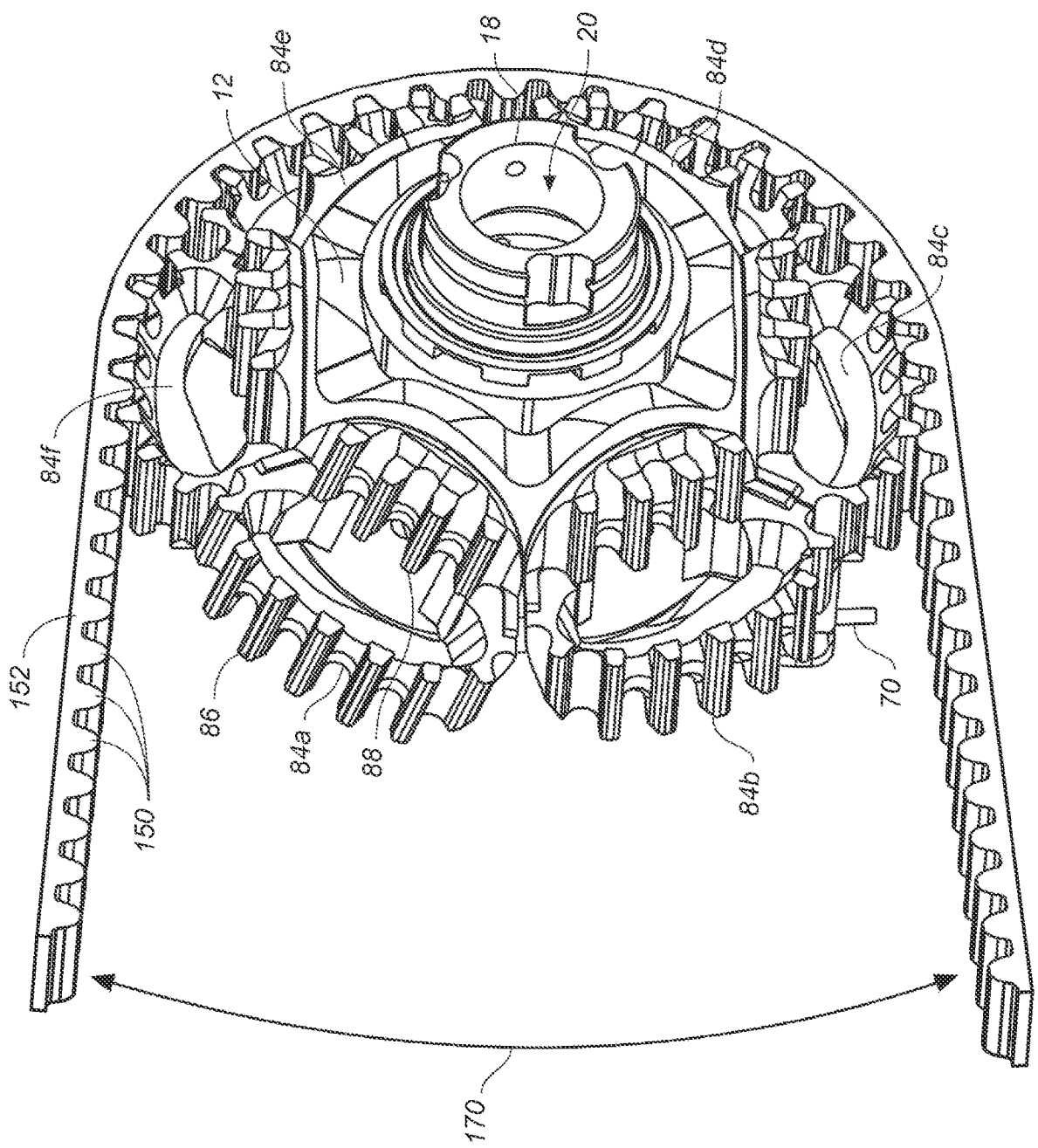
FIG. 8 is a left front perspective view of the segmented pulley transmission with the central hub shown, with a pulley section in the process of initiating a shift through rotation in the shift window.
Figure 9:
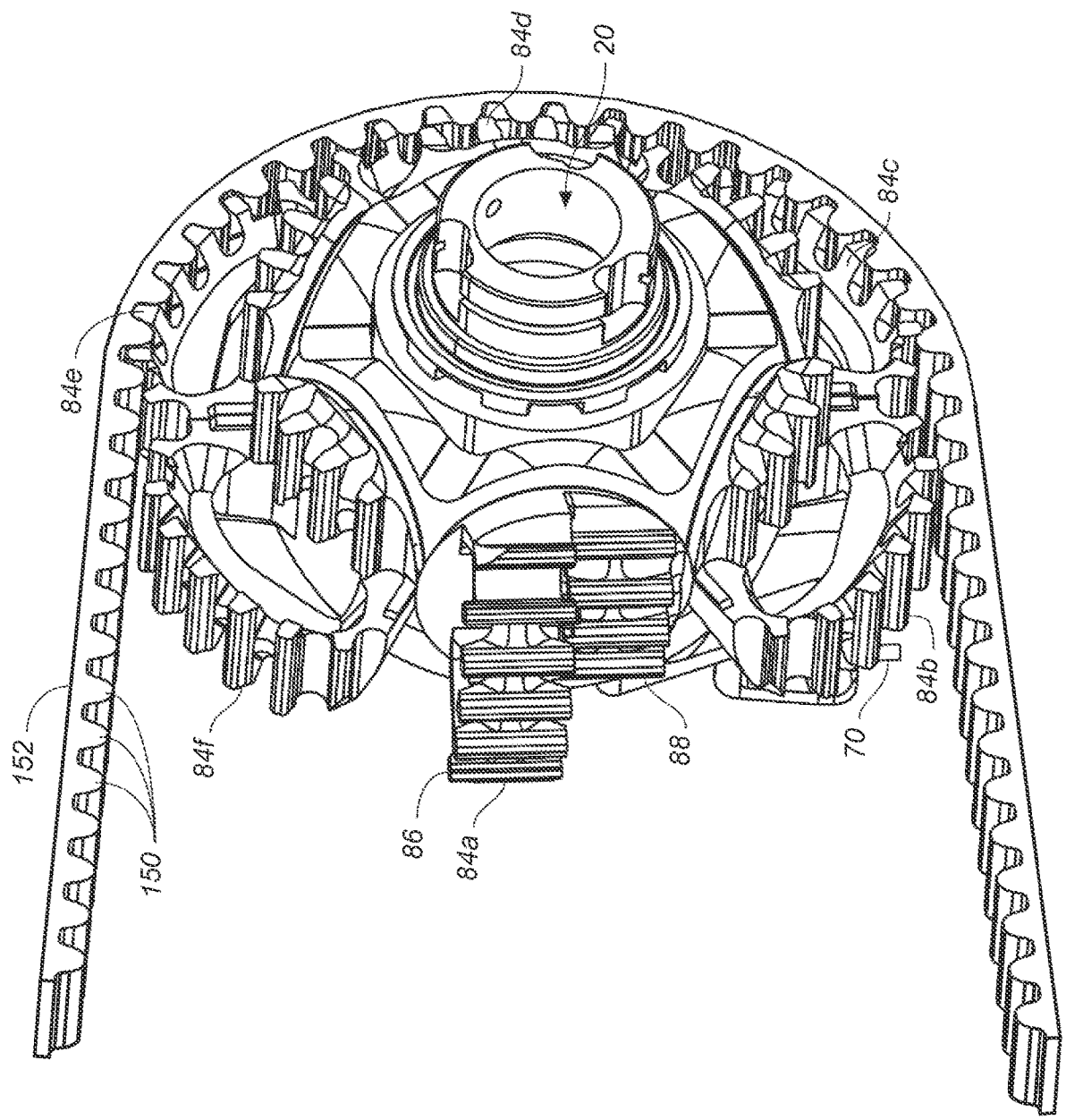
FIG. 9 is the same view showing the shift progressing and substantially half completed, having reached approximately 90 degrees of rotation.
Figure 10:
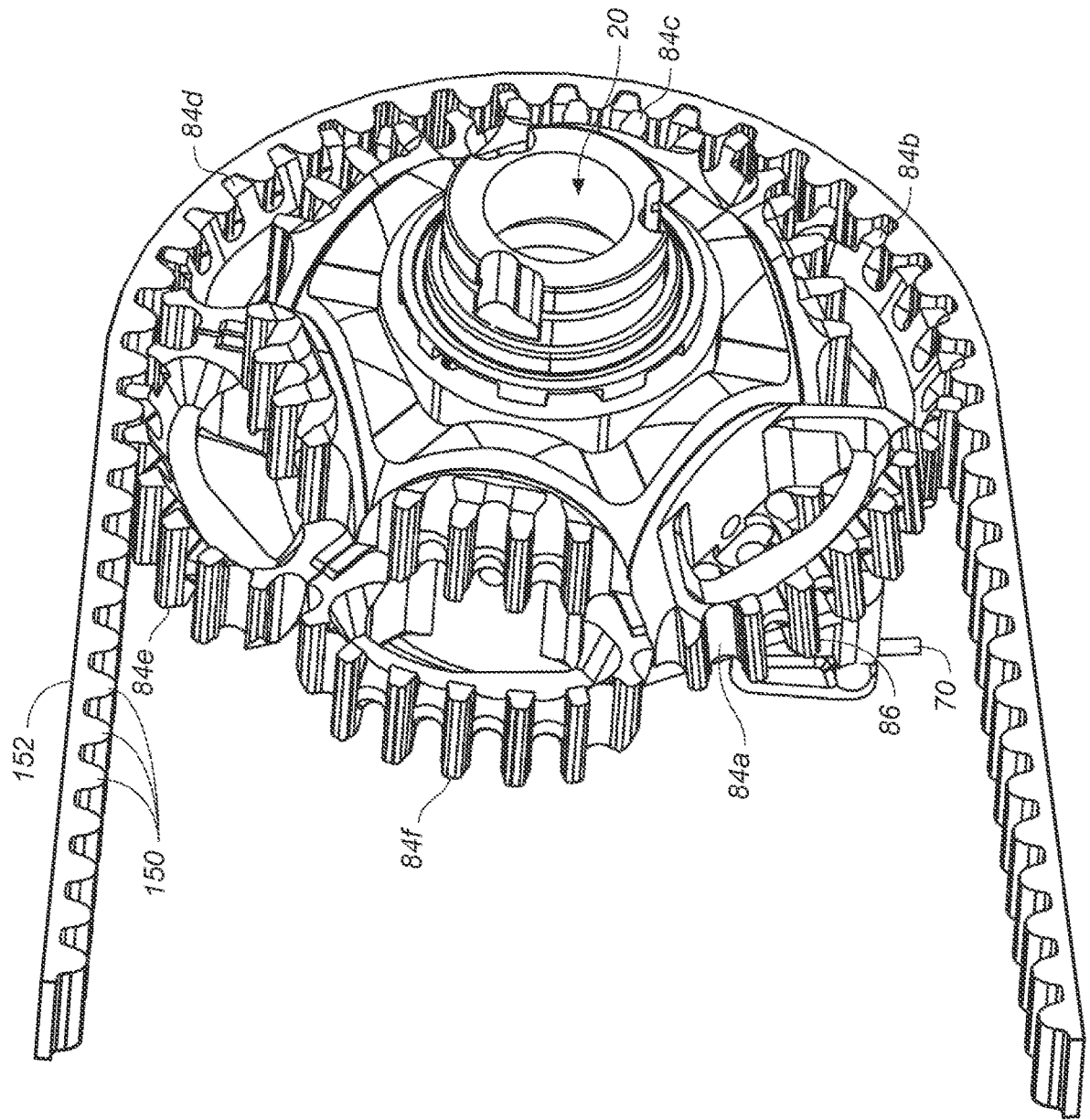
FIG. 10 is the same view showing the pulley segment fully shifted (i.e., rotated 180 degrees)

Referring next to FIGS. 5A-5B, there is shown detail of how the shift wire 64 and stationary partial ring gear 62 are mounted on the shift ring 60. Here it can be seen that the shift wire 64 is passed through a hole 68 in the shift ring at its lateral medial portion 74 such that the hole functions as the pivot point or fulcrum for operational movement. Thus, when the lower end 70 of the shift wire is toggled forward and back, the selector tooth 72 moves radially inwardly and outwardly, respectively, relative to the center of the axial opening 160 of the shift ring. These positions constitute first and second engaged positions of the shift wire. It will be noted that the shift wire is configured with an upper arch 162 to conform to the curvature of the interior side of the shift ring and increase available travel through its curvature around the freehub spacer.

Looking now at FIGS. 6-10, there is shown in more detail the various structural and operational elements of a shifting process. Beginning with FIG. 6, in a right rear perspective view, shown are the principal components involved in shifting the pulley sections 84a-84f, from engagement with the flexible drive member at their upper shelves 86 to their lower shelves 88. As the hub in the transmission is rotated during operation, a shift event is initiated by moving the lower end 70 of the shift wire 64 either forward or back to move the selector tooth 72 into an engagement position. When a pulley segment is rotated into the shift window portion 170 of its rotation about the axle, if the engagement position of the selector tooth is aligned and in the path of one of the respective shift hooks, 136 or 138 (in this instance the shift hook 136 disposed below the upper shelf of the pulley section), the shift hook 136 on pinion gear 98 comes into engagement with the fixed selector tooth. This urges pawls 94 out of their respective detent notches and permits rotation of the pulley segment 84. As the pulley segment continues to rotate about the axle, gear teeth 102b on pinion gear 98 come into engagement with the pulley teeth 62a of stationary partial ring gear 62 to continue the rotation of the segment about its radial axis Ax (see FIG. 7A) and the engagement continues until the rotation is complete and the detents are urged back into detent notches, the pulley section having completed 180 degrees of rotation. In that regard, please note that the involved rotation of pulley segment 84a in FIGS. 8, 9, and 10 corresponds to that shown in FIGS. 7B-7D, respectively.

Figure 11:
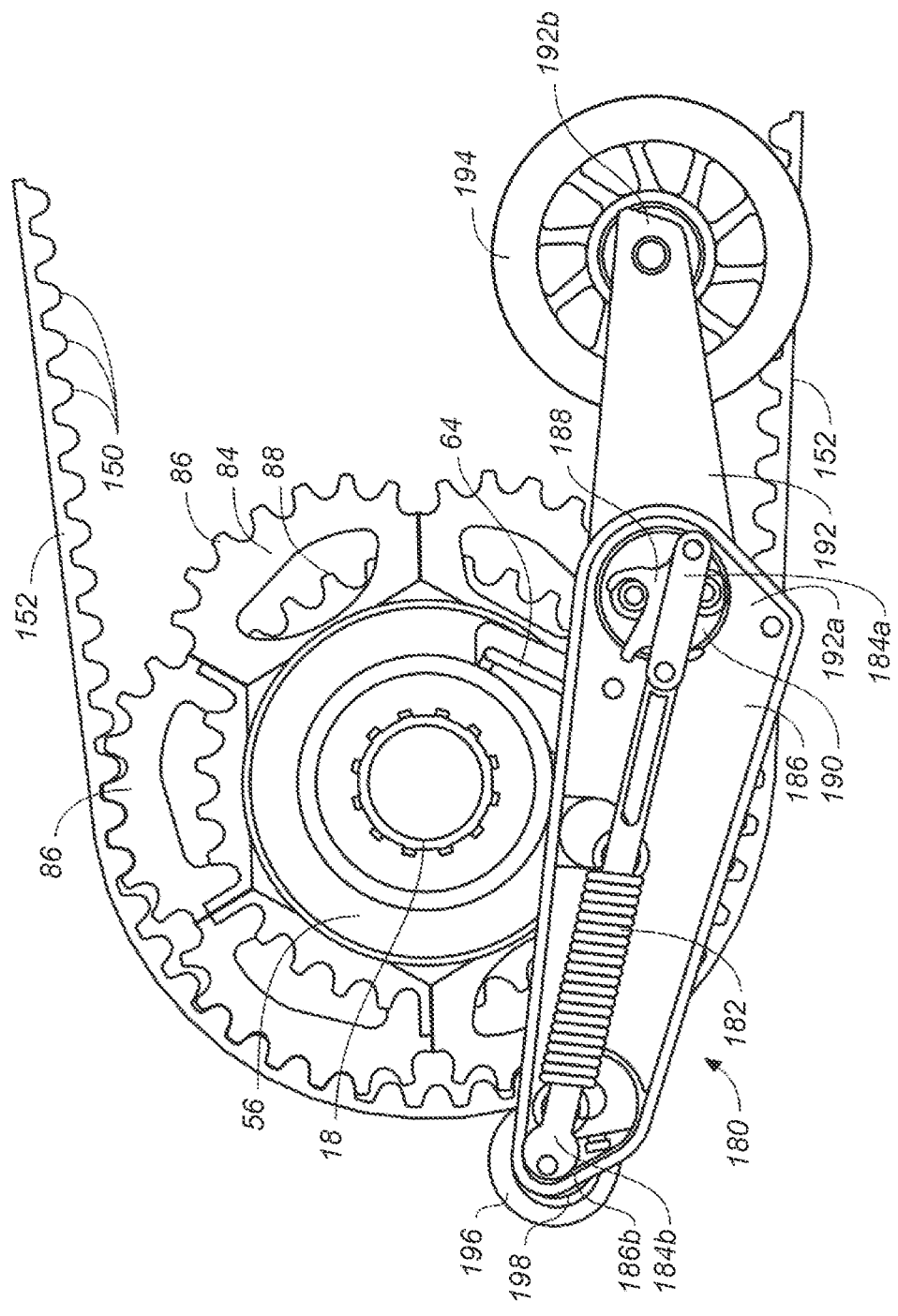
FIG. 11 is a right-side view in elevation of the variable force tensioner with an idler wheel engaging a drive member when the drive member is engaging pulley segments on their upper shelves.
Figure 12:
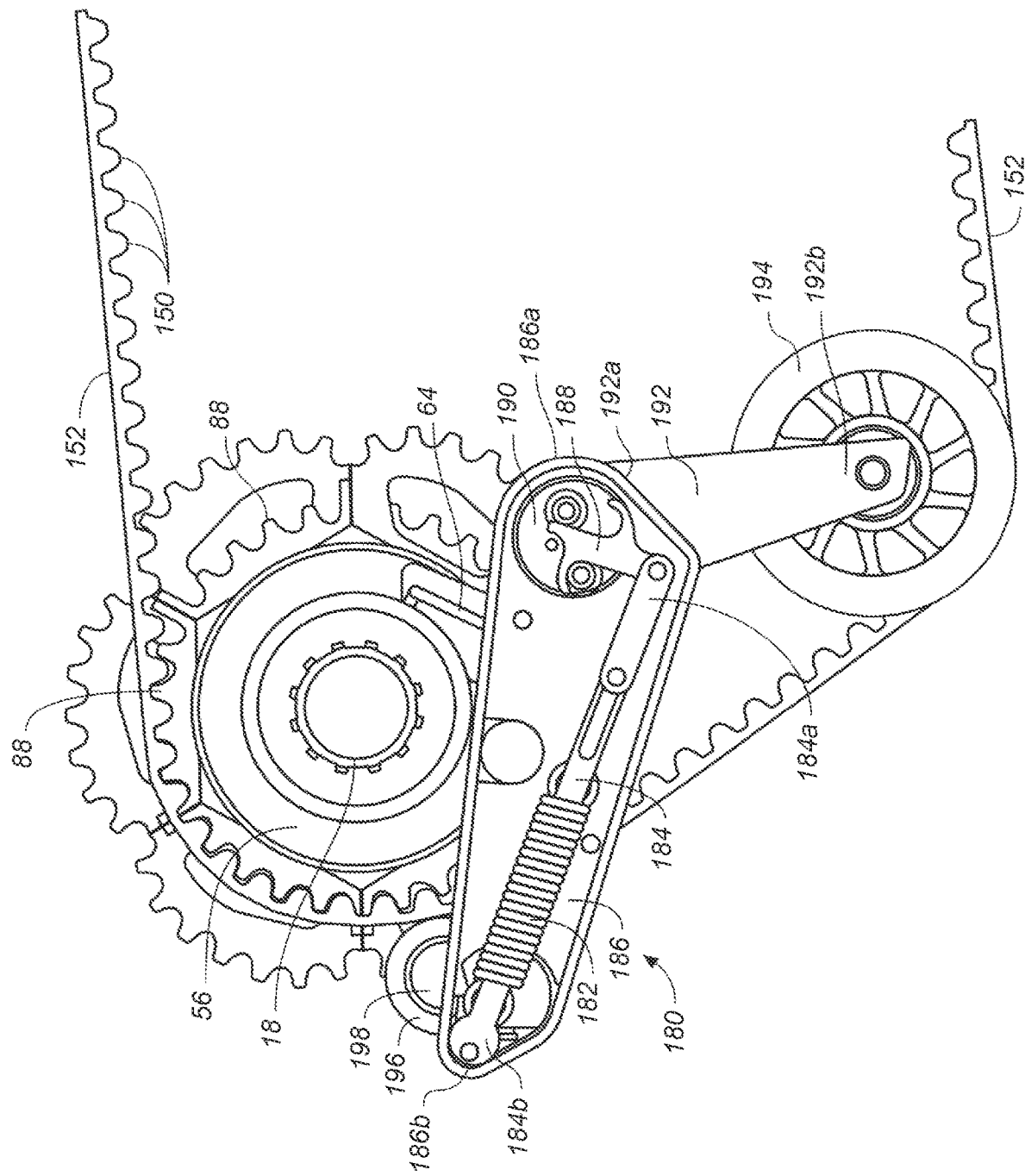
FIG. 12 is the same view, showing the variable force tensioner taking up slack in the drive member when the drive member is engaging the pulley segments on their lower shelves.

Looking next at FIGS. 11-12, there is shown the operation of the variable force tensioner to maintain a substantially constant tension on the drive member. In a multiple-pulley transmission system, if the length of the drive member is fixed (i.e., if drive axle-to-driven axle distance is constant), but the pulley diameter is variable, a drive member take-up device is needed. When the drive member engages the smaller diameter pulleys, the slack in the drive member must be taken up. In the current embodiment, that is precisely the situation. Thus, in embodiments the variable force tensioning can be achieved with a sprung tensioner or an actuated tensioner with an idler wheel. To generate the tension in the drive member required to prevent nonsynchronous motion, it is desirable that the force on the idler wheel be high. When the drive member is engaging the largest pulley (high pulley shelves 86 in combination), there is no slack in the drive member necessary, and it is desirable the force on the idler wheel be much lower (see FIG. 11). The idler wheel can roll on a flat span of the drive member, meaning a small force on the idler wheel results in a large tensile force in the drive member.

Therefore, one novel aspect of this invention is a highly variable spring force mechanism 180 that adjusts for the varying force required, depending on the shift state of the sectioned pulley. In the current embodiment, this is achieved by a tensioning spring 182 disposed on an extensible reciprocating link 184 spanning substantially the length of a lever arm 186 and pivotally connected at a first end 184a to a coupling link 188 proximate a forward end 186a of the lever arm 186 and at a second end 184b to an aft end 186b of the lever arm. The coupling link is connected to a rotatable idler lever bushing 190 disposed in an upper end 192a of an idler lever 192. The reciprocating link defines the possible range of lever arm rotation, with the lever arm pulled against the force of the tensioning spring 182 into an extended position (FIG. 11) when the drive member is engaging the combined pulley segments at their higher shelves, and then urged by the spring into a fully retracted position (FIG. 12) when a shift has changed the pulley segments such that their combined shelf size is at their smallest diameter. In each configuration, an idler wheel 194 rotatably mounted at the outer end 192b of the idler lever 192 engages the drive member 152 to maintain a constant total drive path distance over and around the drive and driven pulleys. At the desired position of the idler lever, the reciprocating link shifts position with respect to the pivot of the lever arm, changing the effective lever arm length acting upon the idler, which also changes the force exerted by the idler wheel against the drive member.

At the aft end 186b of the lever arm 186, a drive member retainer wheel 196 is rotatably disposed on a spring-biased eccentric cam 198, which urges the drive member retainer into constant contact with the drive member so as to keep it, in turn, constantly engaging the pulley shelves.

In some cases, the force required to prevent nonsynchronous motion is too high for a sprung tensioner to reasonably apply to the drive member. A high force on the idler wheel can also make shifts difficult to complete because the motor or force driving the flexible drive member must work against the tensioner spring. One solution in the current embodiment is a retractable drive member retention device. This drive member retainer may be formed of any surface that is placed near or against the drive member as it engages the pulley but is usually a second idler wheel. This retainer prevents any drive member skipping or nonsynchronous motion by pressing the drive member against the pulley sections, or by limiting how far the drive member can disengage from the pulley. In a shifting pulley transmission, the distance between the retainer and the pulley axis of rotation must change as different pulley sections/gears are engaged. The retainer may be mounted on a sprung arm or linear rail, allowing this distance to change with a shift in the pulley sections. The control of the drive member retainer position may be achieved by an actuator or a mechanical connection to the tensioner idler wheel. A spring that forces the retainer against the pulley may also be used, positioned such that the pulley segments can push the drive member retainer idler wheel to a new position in a shift, but the force acting to push the drive member away from the pully (in the radial dimension) is resisted by the retainer.

Figure 13:
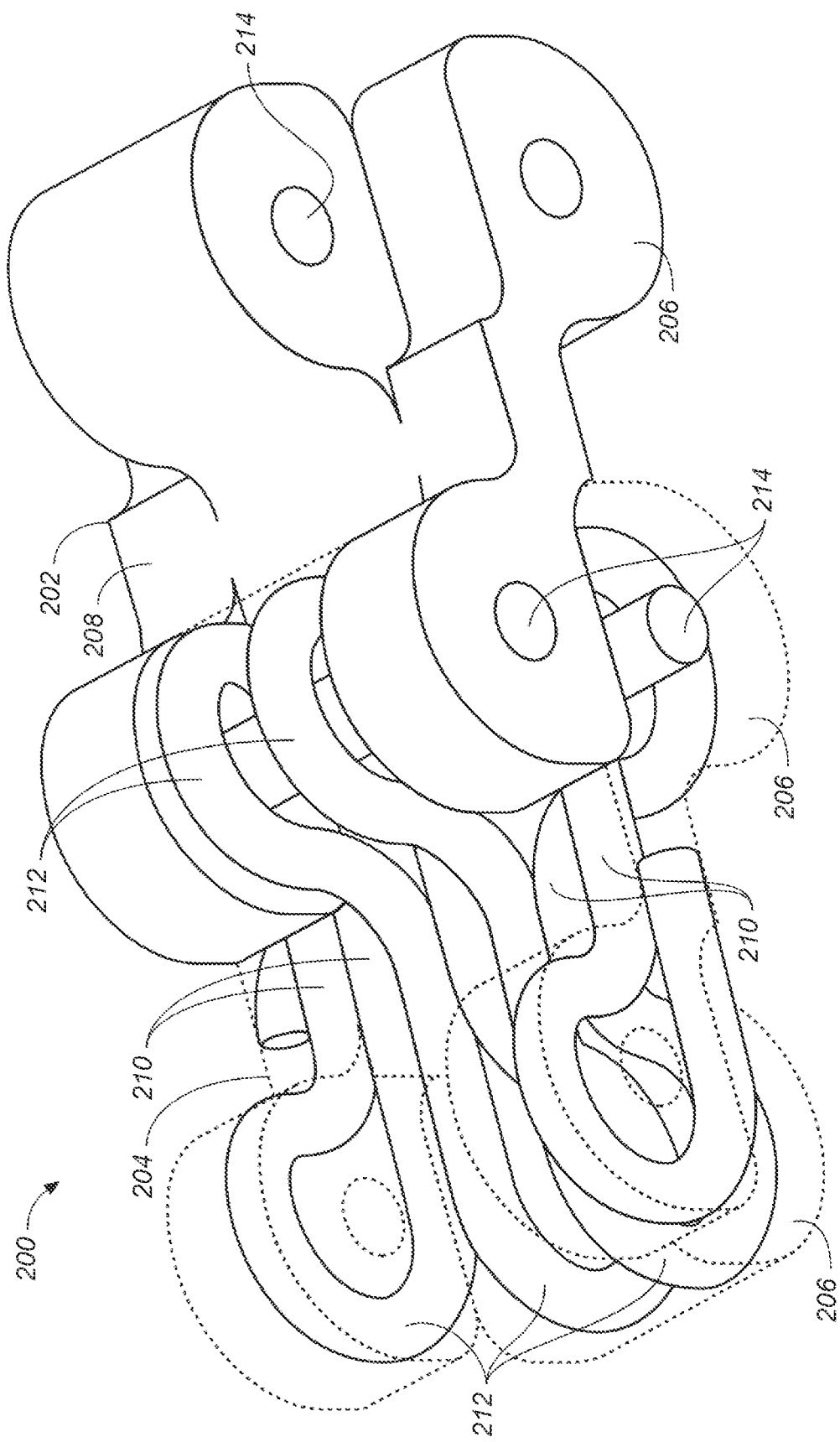
FIG. 13 is an upper perspective view of a drive member as used in the present invention.

Finally, and turning now to FIG. 13, there is shown the flexible drive member of the present invention. This flexible belt 200 (renumbered for this view, seen as Ref. No. 152 in the previously views) may be composed of one or more segments 202, 204, containing two or more drive teeth 206 with a flexible region 208 between them. In the current embodiment, strong and flexible reinforcing load-carrying cords 210 are longitudinally embedded in a flexible body material to increase load capacity, similar to most toothed timing belts. Each load-carrying rod extends to a terminal loop 212, also embedded. In embodiments, the reinforcing load-carrying cords are continuously wound within the flexible body material. At the portion of the drive member employed for lengthy adjustment, there are a plurality of load-carrying cords disposed around a removable transverse bar 214 that may be removed, such that the belt may be shortened and then reconnected. In other embodiments, the load-carrying element may be the segment body material or a solid flexible reinforcing material. In its most essential aspect, the novel flexible drive member preferably used in the present invention includes a wrapping pattern in which the gear teeth on each side of the flexible drive member (i.e., the belt) cooperate with a dado element on the joining end segment.

Principles of Operation: From the foregoing it will be appreciated that in embodiments, the inventive sectioned multiple-step pulley transmission includes a central rotatable hub on which a plurality of identical pulley sections are mounted about the central hub circumference. Collectively, the adjoining pulley segments form an approximately circular stepped pulley shape. Each pulley segment includes two sections, thereby providing two curved shelf surfaces for engaging a flexible drive member, each shelf with a different radius, forming the steps. The pulley sections are independently rotatable about a radial axis with respect to the central hub.

There is always a portion of the stepped pulley not in contact with the drive member, and this is referred to as the shift window. The above-described partial ring gear and selector tooth remain stationary with respect to the rotating central hub, which is used to rotate the pulley sections independently. The pulley segments rotate independently on the central hub about an axis substantially radial to the axis of motion of the pulley and the central hub.

While in the embodiment shown herein comprises pulley segments with two shelf sections, a pulley section may have multiple diameter pulley shelf surfaces integrated into one body. As the pulley section is rotated, the surface with the desired diameter is placed in the path to engage the drive member once the rotated pulley section has rotated past the shift window. The shelf surface can be moved into the drive member engaging position by rotating a section of the step pulley to exchange the positions of different steps at different radial distances from the axis of rotation.

In embodiments, a shift mechanism may include a shift wire and partial ring gear to initiate a shift event by bringing the partial ring gear into engagement with a pinion gear on the underside of a pulley segment. The pinion is mounted in the pulley body and rotates about the same axis as the section. The partial ring gear is stationary and has only enough teeth to rotate the pinion the desired amount for each shift, 180 degrees of rotation, for instance, for a two-speed transmission. Those with skill in the art will appreciate that the foregoing pulley segment configuration may use several alternative means of actuating pulley section rotation in a shift.

For instance, the selector tooth or shift control mechanism may be actuated by an electromagnet or motor. An actuator cable or hydraulic or pneumatic piston may also be used. One or more shift actuators that rotate with the pulley are also possible. In an embodiment, a stationary pneumatic bladder may be employed to push a plate connected to the selector tooth into different engaged positions. A pneumatic bladder has several structural and operational advantages in being lightweight, easy to produce, durable, compact, and in facilitating an easy and quick replacement of working fluid.

To maintain constant power transfer while using a synchronous or toothed drive member, there must be constant engagement between the drive member and the pully segments, even during a shift event. Therefore, it is advantageous for drive teeth on each shelf of each segment to be positioned in such a way that when the drive member spans multiple step diameters, the teeth on the lower gear and the higher gear can both be engaging the drive member simultaneously.

Alternatively, in embodiments, the inventive system may include a small mismatch between the drive member and variable pulley steps. This enables the drive member teeth to engage the pulley teeth on the new section without any load or friction. As the pulley rotates, the load is eventually transferred to the new section. This arrangement reduces ratcheting of the drive member over the pulley teeth.

To prevent sudden deleterious spikes in acceleration in the system during a rapid shift, pulley sections may be shaped with radii not concentric to the pulley axis of rotation, and act to increase the time in which the drive member is in a transition period between pulley shelves of different diameters. To further reduce acceleration during a shift, at least one pulley shelf may be noncircular with a drive surface that is not concentric to other pulley shelves. However, this noncircular pulley surface formed from the pulley segments causes the rotational velocity of the pulley to fluctuate when the drive member is driving in a steady state.

In the current embodiment, the flexible drive member is a positive engagement synchronous endless drive member, such as a timing belt or roller chain. Many positive engagement synchronous endless drive members have been described in prior art. Positive engagement drive members generally have the highest efficiency and load carrying capacity when compared to nonsynchronous drives members.

A chain drive is a type of synchronous drive made from interlocking rigid links, with pivots between them. The pivot points wear over time due to sliding friction, and often require lubrication. The use of high-density material means they usually have a large mass when compared to the power transmission capacity. Chain drives are limited in speed due to their mass, and have limited noise or vibration dampening properties.

A toothed belt dive is another type of synchronous drive made from flexible material that does not require pivots, but toothed belts are limited in the material that can be used and rarely can be detached or assembled into variable lengths after production. Also, disadvantageously, the toothed belt has a reduced load capacity due to the bond between the tensile material and the tooth material. Most disadvantageously, toothed belts are also not detachable for sizing and assembly in most cases.

It is therefore desirable to have a detachable drive member that enables the endless drive member to be assembled and adjusted to the required length, so that the drive may be installed through an enclosed area. This reduces installation time, product inventory and shipping requirements, and production costs for different lengths and widths.

To combine the advantages of chain drives and belt drives, a new hybrid class of modular synchronous drive members is necessary for the multiple step pulley of the present invention. The above-described flexible drive member of the present invention employs the flexing regions of toothed belts with the detachable nature of a chain.

The drive member of the present invention may be composed of one or more segments containing two or more drive teeth with a flexible region between them. In the current embodiment, strong and flexible reinforcing load-carrying cords are embedded in a flexible body material to increase load capacity, similar to most toothed timing belts. In other embodiments, the load-carrying element may be the segment body material or a solid flexible reinforcing material.

The defining characteristic of toothed belts power transmissions is the power carrying density. The smaller the drive with the higher power carrying capacity is generally considered superior. Therefore, it is necessary to connect the load carrying cords in the belt in the strongest manner possible. There is limited space to splice or join the load carrying cords in the flexible region.

The segments are connected to form an endless member by a dado joint in the tooth region of each segment. Transverse connecting pins are inserted through the ends of two segments to link the dado joint. In this manner, the connecting technology is analogous to a roller chain. One novel element of this invention is the belt segment forms a drive member with teeth on both the inner and outer face, similar to a double-sided timing belt. Much more cross-sectional area is available to the joint with this configuration. This allows for two dado joints and two pins to be used at each segment-segment interface, equalizing load transfer and doubling the strength of the joint. The double-pin configuration prevents any pivoting and associated sliding friction or wear in the joint area, and most of the flex from wrapping around a pulley occurs in the flexible region. In this way, a fully assembled modular belt behaves similarly to a synchronous toothed belt of classical construction.

The modular belt configuration is also important for allowing force transfer between the load-carrying cords and the transverse connecting pins. The most compact method for this transfer is to wrap the load-carrying cords around the connecting pins. This method requires more space than is generally available in a tooth on one side of the belt segment, therefore in this invention, half the cords can be wrapped around the inner connecting pins and half the cords may be wrapped around the outer connecting pins. This allows all the reinforcing material to transmit drive load to the transverse connecting pins.

The flexible region in each drive member segment must be as flat and thin as possible to minimize the minimum bend radius of the modular drive member. Because the cords wrapped around the connecting pins are not in plane with the region of the cord in the flexible area, there is a tendency for the cord in the flexible area to be pulled out of plane by the drive load. In order to minimize this tendency, the cords in the flexible area may be twisted around themselves to keep them all compact and in the same plane, similar to splicing a loop at the end of a rope.

Transitioning between two pulley segment shelves can impart tight bends in the drive member at the transition point. It is therefore desirable to have a drive member that can resist high loads while bending in a tight radius.

Chains work well in this regard, but high-performance belts have a relatively large minimum bend radius.

Because the reinforcing cords in the current embodiment wrap around a small diameter pin (compared to the diameter of the cord), the highest strength, most flexible cord or fiber available is desirable. Some examples include aramid fibers and UHMW-PE fibers. The fibers that are wrapped around the transverse connecting pins are effectively embedded in the teeth that engage the pullies, providing direct load transfer between the pulley cogs and the belt teeth. This is unlike most belts, where the reinforcing cords are linear and do not enter the teeth, and load must be transferred to the reinforcing cords by means of adhesion between the cord and the tooth material.

Because the modular belt in this design may utilize high-performance but flexible polymer cords, it is better able to resist high forces in a small bend radius. Usually, the use of these fibers is limited due to the limit of adhesion between the tooth body material and the fibers. Because torque is transferred directly from the pulley cogs to the fibers in this embodiment, the adhesive strength is allowed to be lower, and polymers like UEMW-PE may be used more easily.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A multiple step pulley for variable power transmission, comprising:
   a central hub which rotates about a hub axis, said central hub having a hub shell;
   a plurality of operationally identical pulley segments rotatingly disposed on said hub shell and configured with pulley sections having at least first and second shelf portions which collectively align to engage a flexible drive member in a drive portion of the multiple step pulley as said central hub rotates under a force applied by the flexible drive member or at it applies force to a flexible drive member, and to disengage from the flexible drive member in a shift window portion of each rotation of said central hub about said hub axis, said pulley segments further configured with elements that engage a shifting mechanism; and
   a shifting mechanism operatively connected to said central hub and configured to selectively engage said each of pulley segments in said shift window portion;

wherein said pulley segments rotate about a pulley segment axis substantially radial to said hub axis; and wherein said first and second shelf portions each define an arc having a different radius from said hub axis.

2. The multiple step pulley of claim 1, wherein each of said first and second shelf sections comprises an arc that combine and align with all other of the respective first and second shelf portions to form a substantially circular multisectioned pulley with spacing between each of said pulley sections to permit rotation of each of said pulley sections in said shift window about said pulley section axes.

3. The multiple step pulley of claim 1, wherein said pulley sections have at least first and second shelves.

4. The multiple step pulley of claim 3, wherein said at least first and second shelves of each of said pulley sections are in a side-by-side relationship straddling said pulley segment axis.

5. The multiple step pulley of claim 1, wherein said shifting mechanism comprises a shift ring, a stationary partial ring gear, and a shift wire with a selector tooth, and said pulley segments include a pinion gear and shift hooks configured to engage said selector tooth when in a shift configuration.

6. The multiple step pulley of claim 5, wherein each pulley segment further includes at least one spring-biased pawl that engages a detent disposed in said hub to prevent rotation of a pulley segment beyond that needed for a shift from one shelf to another shelf and which stabilizes said pulley segment between shifts.

7. The multiple step pulley of claim 1, wherein said central hub is configured with an axial opening adapted to accept a cassette body.

8. The multiple step pulley of claim 6 configured for incorporation into a bicycle drive system.

9. The multiple step pulley of claim 7, wherein said multiple step pulley is configured for incorporation into a rear internal gear hub.

10. The multiple step pulley of claim 1, wherein each of said pulley segments comprises an assembly having said pulley sections exposed for operational engagement with a flexible drive member and shifting elements disposed in said hub interior for selective engagement with said shifting mechanism.

11. The multiple step pulley of claim 10, wherein said shifting elements of said pulley segments include pinion gears having symmetrically opposing sets of gear teeth and shift hooks disposed therebetween.

12. The multiple step pulley of claim 11, wherein said shifting mechanism includes a stationary partial ring gear and a shift ring with a shift wire having a selector tooth which engages said shift hook to initiate a shift event when a shift is selected, thereby bringing one of said set of opposing sets of gear teeth on said pulley segments into mesh engagement with said stationary partial ring gear.

13. The multiple step pulley of claim 1, further including a variable force tensioner to maintain a substantially constant tension on the flexible drive member during operation, including during shift events.

14. The multiple step pulley of claim 13, wherein said variable force tensioner includes an idler wheel urged against the flexible drive member with a variable spring force mechanism.

15. The multiple step pulley of claim 14, wherein said idler wheel engages said flexible drive member proximate the end of said shift window portion.

16. A pulley for a transmission system, comprising;
a central rotatable hub having a circumference; and
a plurality of adjoining identical pulley sections rotatably mounted about the central hub circumference, wherein the adjoining pulley segments form an approximately circular stepped pulley shape and each of said pulley segments includes two sections providing two curved shelf surfaces for engaging a flexible drive member, each shelf having a different radius, forming higher and lower steps, and further wherein each of said pulley segments are independently rotatable about a radial axis with respect to said central hub.

\* \* \* \* \*